(12) United States Patent
Sutherland et al.

(10) Patent No.: US 10,894,499 B2
(45) Date of Patent: Jan. 19, 2021

(54) INCINERATOR TRANSPORT TRAILER AND SYSTEM

(71) Applicant: Questor Technology Inc., Calgary (CA)

(72) Inventors: John Sutherland, Calgary (CA); Jeffrey David Nelson, Calgary (CA); Justin Edward Bouchard, Calgary (CA)

(*) Notice: Subject to any disclaimer, the term of this patent is extended or adjusted under 35 U.S.C. 154(b) by 0 days.

(21) Appl. No.: 16/166,250

(22) Filed: Oct. 22, 2018

(65) Prior Publication Data

US 2020/0122625 A1    Apr. 23, 2020

(51) Int. Cl.

| | |
|---|---|
| *B60P 3/00* | (2006.01) |
| *B62D 63/06* | (2006.01) |
| *B62D 63/08* | (2006.01) |
| *B60P 7/06* | (2006.01) |
| *B60P 1/16* | (2006.01) |
| *B62D 21/03* | (2006.01) |
| *F23G 5/40* | (2006.01) |
| *F23G 7/06* | (2006.01) |
| *B60S 9/02* | (2006.01) |

(52) U.S. Cl.
CPC ............. *B60P 3/00* (2013.01); *B60P 1/165* (2013.01); *B60P 7/06* (2013.01); *B60S 9/02* (2013.01); *B62D 21/03* (2013.01); *B62D 63/068* (2013.01); *B62D 63/08* (2013.01); *F23G 5/40* (2013.01); *F23G 7/06* (2013.01); *F23G 2203/601* (2013.01); *F23G 2209/14* (2013.01)

(58) Field of Classification Search
CPC ............... B60P 3/00; B60P 1/165; F23G 5/40
USPC .......................... 414/359, 360, 381, 391, 482
See application file for complete search history.

(56) References Cited

U.S. PATENT DOCUMENTS

| 7,214,028 B2* | 5/2007 | Boasso | ................. B28C 7/0084 414/812 |
|---|---|---|---|
| 2016/0033210 A1* | 2/2016 | Reich | ..................... B23P 19/024 165/67 |

* cited by examiner

*Primary Examiner* — Saul Rodriguez
*Assistant Examiner* — Willie Berry, Jr.

(57) ABSTRACT

An incinerator transport trailer has a chassis and an incinerator receiving and supporting cradle pivotally attached to the chassis for movement relative to the chassis between a travel position in which the cradle is positioned parallel to and extends along the chassis and a raised position in which the cradle extends generally perpendicular to the chassis. A first incinerator engagement is attached to the cradle toward a first end of the cradle for back-and-forth movement along a direction extending generally between the first and second ends of the cradle. A second incinerator engagement is attached to the cradle toward a second end of the cradle. The first incinerator engagement is movable to increase or decrease a distance between the first incinerator engagement and the second incinerator engagement to removably secure an incinerator to the cradle.

12 Claims, 8 Drawing Sheets

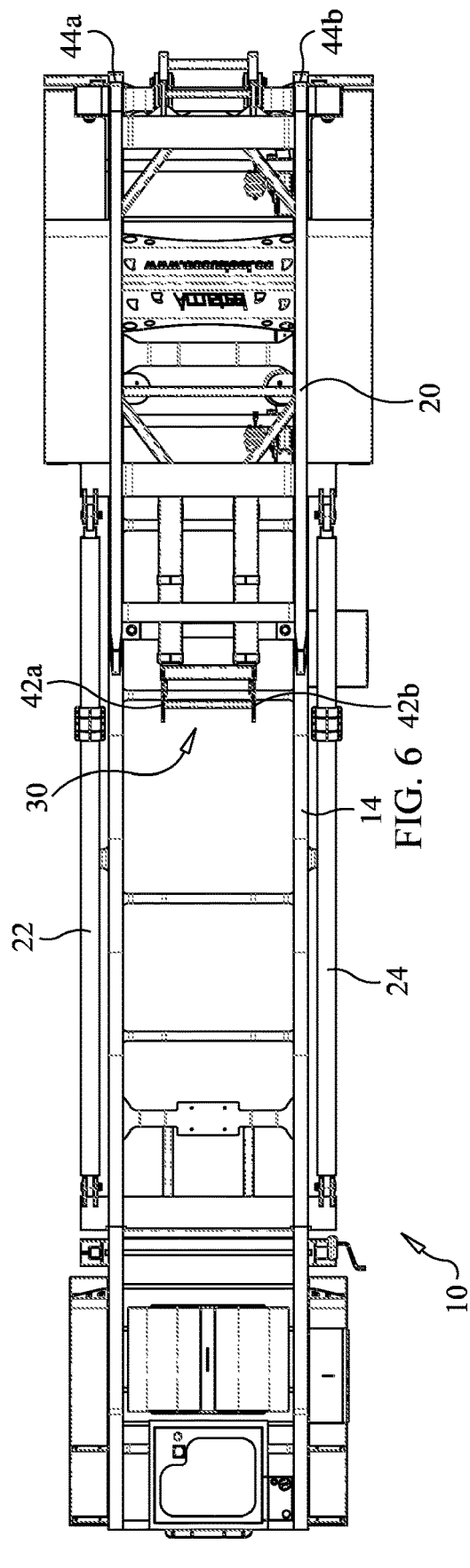
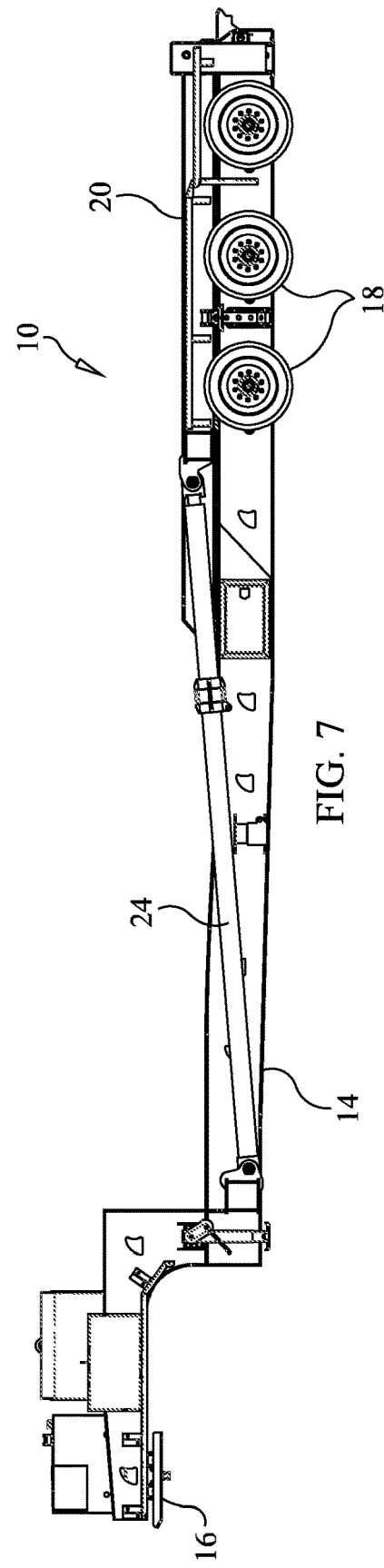
FIG. 6
FIG. 7

INCINERATOR TRANSPORT TRAILER AND SYSTEM

FIELD OF THE INVENTION

The present invention relates generally to transporting incinerators between locations, and more particularly, relating to an incinerator transport trailer and system for transporting incinerators between locations.

BACKGROUND OF THE INVENTION

Gas incinerators are commonly used in the oilfield production industry to burn waste gas produced by hydrocarbon wells. The amount of waste gas produced by a hydrocarbon well changes overtime, with the highest production of waste gas generally occurring at the beginning of production. Accordingly, the capacity to incinerator or combust the waste gas also changes overtime. For this reason, movable, skid-mounted gas incinerators are popular because they can be temporarily installed at the wellsite and then removed when the required incineration capacity drops below a level requiring the incinerator.

While movable, temporary gas incinerators are popular for their costs savings, transporting them presents challenges, including loading and unloading the incinerator from a transport vehicle, typically a flatbed trailer. Conventionally, a crane is required at the site to offload the incinerator from the trailer and position the incinerator at the site. The need to have a crane at the site increases operating costs and requires coordination between the crane operator and the incinerator transport to ensure the crane is available when the incinerator transport is at the site. Accordingly, there is a need and desire for an improved way of transporting incinerators between locations.

SUMMARY OF THE INVENTION

The present specification describes a trailer for transporting an incinerator between locations that eliminates the need for additional equipment to offload and position the incinerator. Also described is a system for transporting an incinerator that includes the foregoing trailer and an incinerator configured for use with the trailer.

Accordingly, in one aspect an incinerator transport trailer has a chassis having a first end and a second end, a hitch is located at the first end and ground engaging wheels are located at the second end. An incinerator receiving and supporting cradle has a first end and a second end and the cradle is pivotally attached to the chassis for movement relative to the chassis between a travel position in which the cradle is positioned parallel to and extends along the chassis and a raised position in which the cradle extends generally perpendicular to the chassis. A first incinerator engagement is attached to the cradle toward the first end of the cradle for back-and-forth movement along a direction extending generally between the first and second ends of the cradle. A second incinerator engagement is attached to the cradle toward the second end of the cradle. The first incinerator engagement is movable to increase or decrease a distance between the first incinerator engagement and the second incinerator engagement to removably secure an incinerator to the cradle.

In another aspect, an incinerator transport system has a trailer and incinerator combination that are constructed to cooperatively work together. The incinerator has a top end and a bottom end and a sidewall extending between the top and bottom ends. The incinerator further has a first engagement bracket disposed toward the top end of the incinerator and a second engagement bracket disposed toward the bottom end of the incinerator.

The trailer has a chassis having a first end and a second end, a hitch is located at the first end and ground engaging wheels are located at the second end. An incinerator receiving and supporting cradle has a first end and a second end and the cradle is pivotally attached to the chassis for movement relative to the chassis between a travel position in which the cradle is positioned parallel to and extends along the chassis and a raised position in which the cradle extends generally perpendicular to the chassis. A first incinerator engagement is attached to the cradle toward the first end of the cradle for back-and-forth movement along a direction extending generally between the first and second ends of the cradle. A second incinerator engagement is attached to the cradle toward the second end of the cradle. The first incinerator engagement is movable to increase or decrease a distance between the first incinerator engagement and the second incinerator engagement to removably secure an incinerator to the cradle and wherein the incinerator is removably secured to the cradle by the first incinerator engagement engaged with the first engagement bracket and the second incinerator engagement engaged the second engagement bracket.

There has thus been outlined, rather broadly, some of the important features of the invention in order that the detailed description thereof that follows may be better understood and in order that the present contribution to the art may be better appreciated.

Numerous objects, features and advantages of the present invention will be clear to those of ordinary skill in the art upon a reading of the following detailed description of presently preferred, but nonetheless illustrative, embodiments of the present invention when taken in conjunction with the accompanying drawings. The invention is capable of other embodiments and of being practiced and carried out in numerous ways. Also, it is to be understood that the phraseology and terminology employed herein are for descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

For a better understanding of the invention, its operating advantages and the specific objects attained by its uses, reference should be had to the accompanying drawings and descriptive matter in which there are illustrated embodiments of the invention.

BRIEF DESCRIPTION OF THE DRAWINGS

The following drawings illustrate by way of example and are included to provide further understanding of the invention for illustrative discussion of the embodiments of the invention. No attempt is made to show structural details of the embodiments in more detail than is necessary for a fundamental understanding of the invention, the description taken with the drawings making apparent to those skilled in the art how the several forms of the invention may be embodied in practice. Identical reference numerals do not necessarily indicate an identical structure. Rather, the same reference numeral may be used to indicate a similar feature of a feature with similar functionality. In the drawings:

FIG. 6 is top view of the incinerator transport trailer without an incinerator;

FIG. 7 is a side elevation view of the incinerator transport trailer without an incinerator.

DETAILED DESCRIPTION OF THE INVENTION

Figure 1:
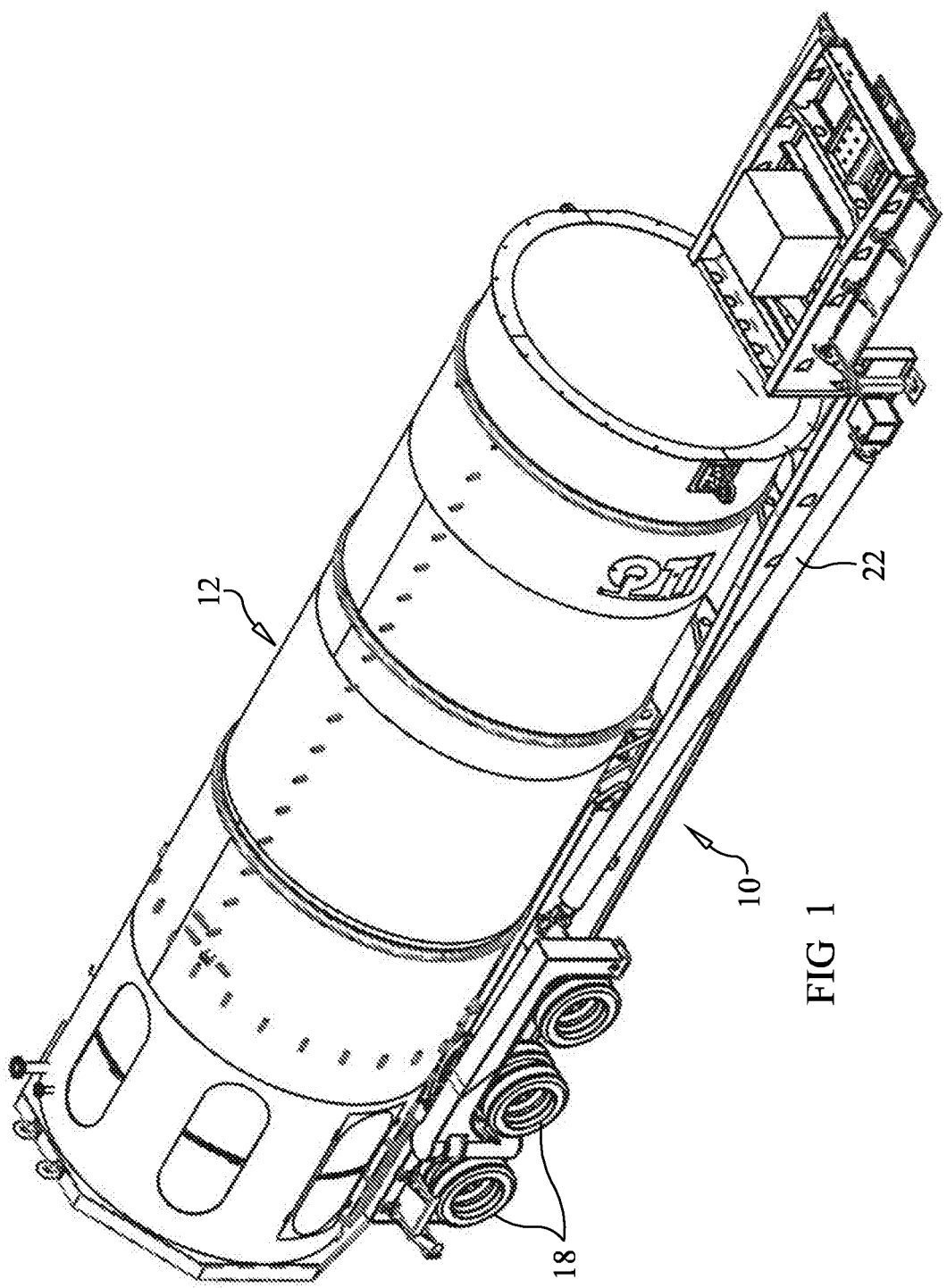
FIG. 1 is a perspective view of an incinerator transport trailer carrying an incinerator that is disposed in a travel position on the trailer in accordance with the principles of an embodiment of the present invention.

With reference to FIGS. 1-9, a gas incinerator transport trailer constructed in accordance with an embodiment of the present invention is representatively illustrated and designated by reference number 10. The trailer 10 is configured to connect to incinerator 12 and lift the incinerator off the ground and position it on the trailer for transportation between locations. Similarly, the trailer 10 is configured to lift the incinerator off the trailer and set it safely on the ground in an upright, standing position ready for use.

Trailer 10 includes an elongated chassis 14 of a metal frame construction that is generally fabricated as a gooseneck-type. Conventionally, at one end, the chassis 14 has a hitch 16 for connection with a tow vehicle and, at the opposite end, the chassis has a plurality of ground engaging wheels 18 supported on respective axel assemblies. While the trailer chassis 14 is representatively shown having a gooseneck-type construction, the chassis should not be limited to this type of construction. Rather, the chassis 14 could have other constructions so long as it still meets the objectives of the present invention.

Figure 2:
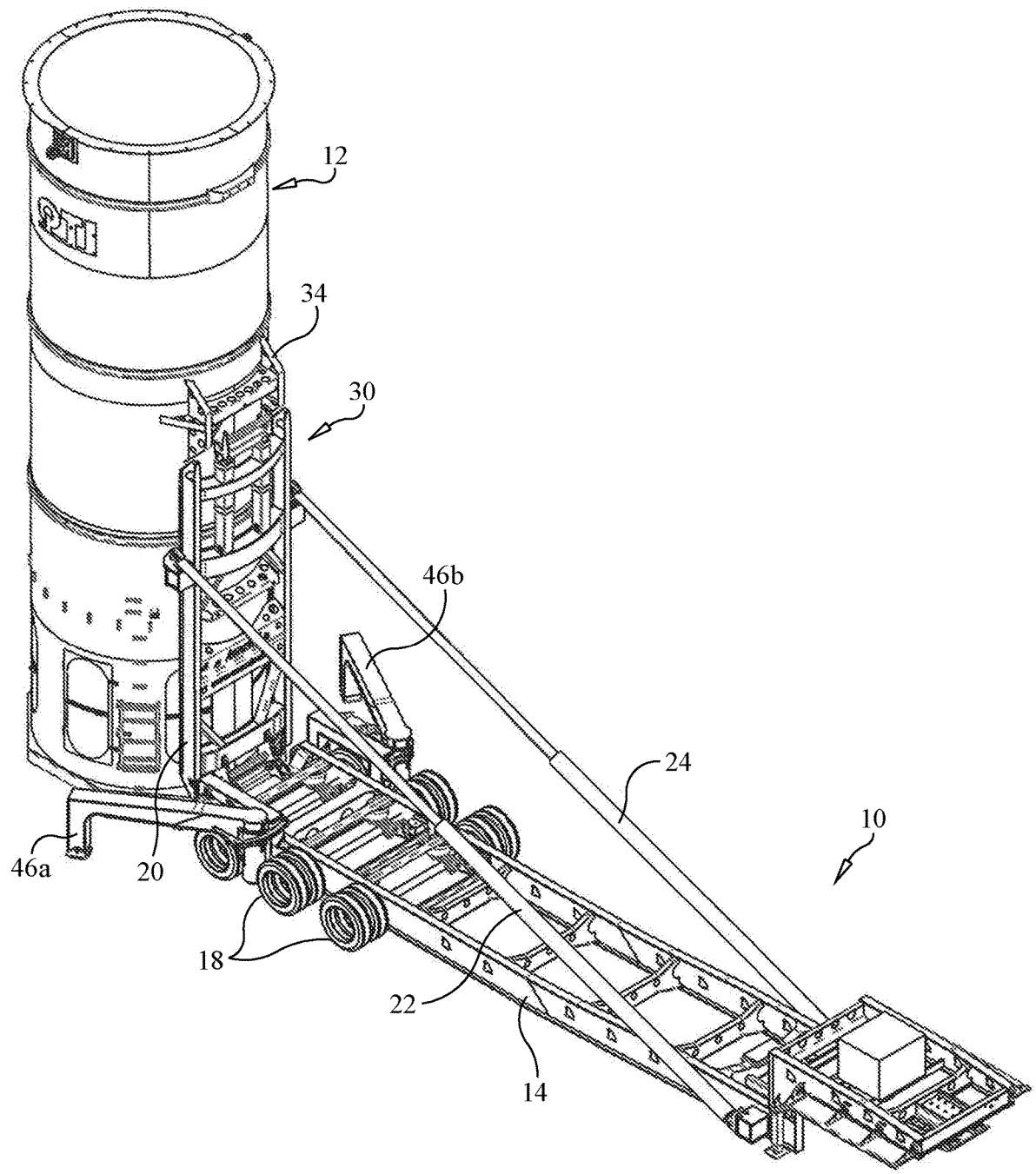
FIG. 2 is a perspective view of the incinerator transport trailer carrying an incinerator that is disposed in an offloading or loading, upright position.
Figure 4:
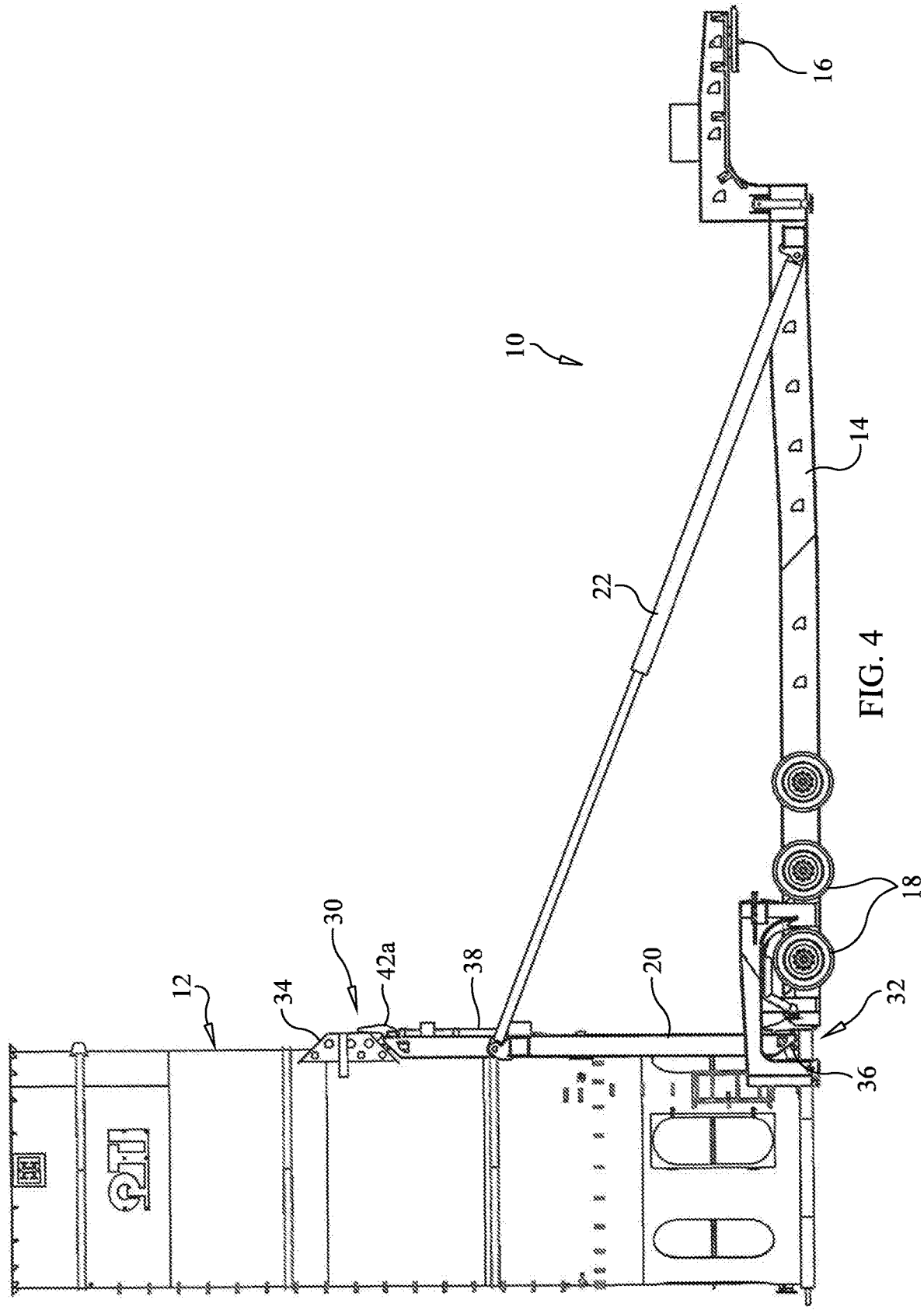
FIG. 4 is a side elevation view of the incinerator transport trailer carrying an incinerator that is disposed in an offloading or loading, upright position.
Figure 5:
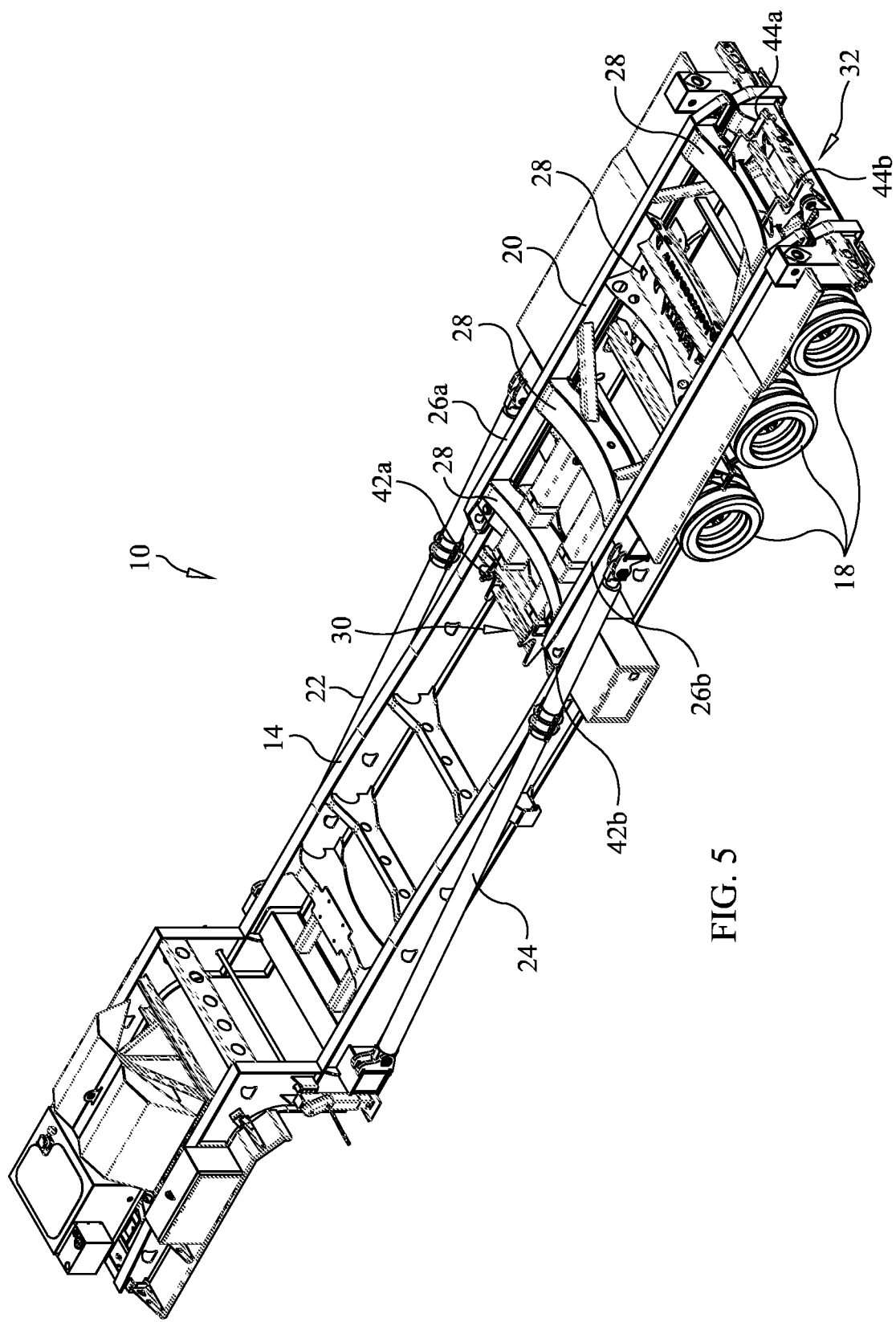
FIG. 5 is a perspective view of the incinerator transport trailer without an incinerator.

Trailer 10 further includes a tilting cradle 20 that is pivotally attached at one end to the chassis 14 by pivot couplings at the rear end of the chassis for rotation between a raised position, as best seen in FIGS. 2 and 4, and a lowered, transport position, as best seen in FIGS. 5 and 7. In the lowered, transport position, the cradle 20 is positioned substantially parallel to and along the chassis 14. In the raised position, the cradle 20 is positioned substantially perpendicular to the chassis 14 in a vertical position relative to the chassis. The cradle 20 is moved between the raised and lowered positions by one or more hydraulic cylinders 22 and 24. As representatively shown, hydraulic cylinders 22 and 24 are disposed along opposite sides of the frame chassis 14. Each hydraulic cylinder 22 and 24 is pivotally connected at one end to the chassis and pivotally connected at the opposite end to the cradle 20. In operation, the hydraulic cylinders 22 and 24 are extended to raise the cradle 20 and retracted to lower the cradle.

Cradle 20 is constructed to removably engage incinerator 12 for lifting the incinerator on and off the trailer 14 and to support the incinerator during lifting and transportation on the trailer. As shown, the cradle 20 includes a pair of elongated side rails 26a, 26b that are connected in a spaced relation and a plurality of transverse rails 28 extending between and spaced along the elongated side rails. One or more of the transverse rails 28 may have a concave surface for engagement with a curved sidewall of the incinerator 12.

Figure 3:
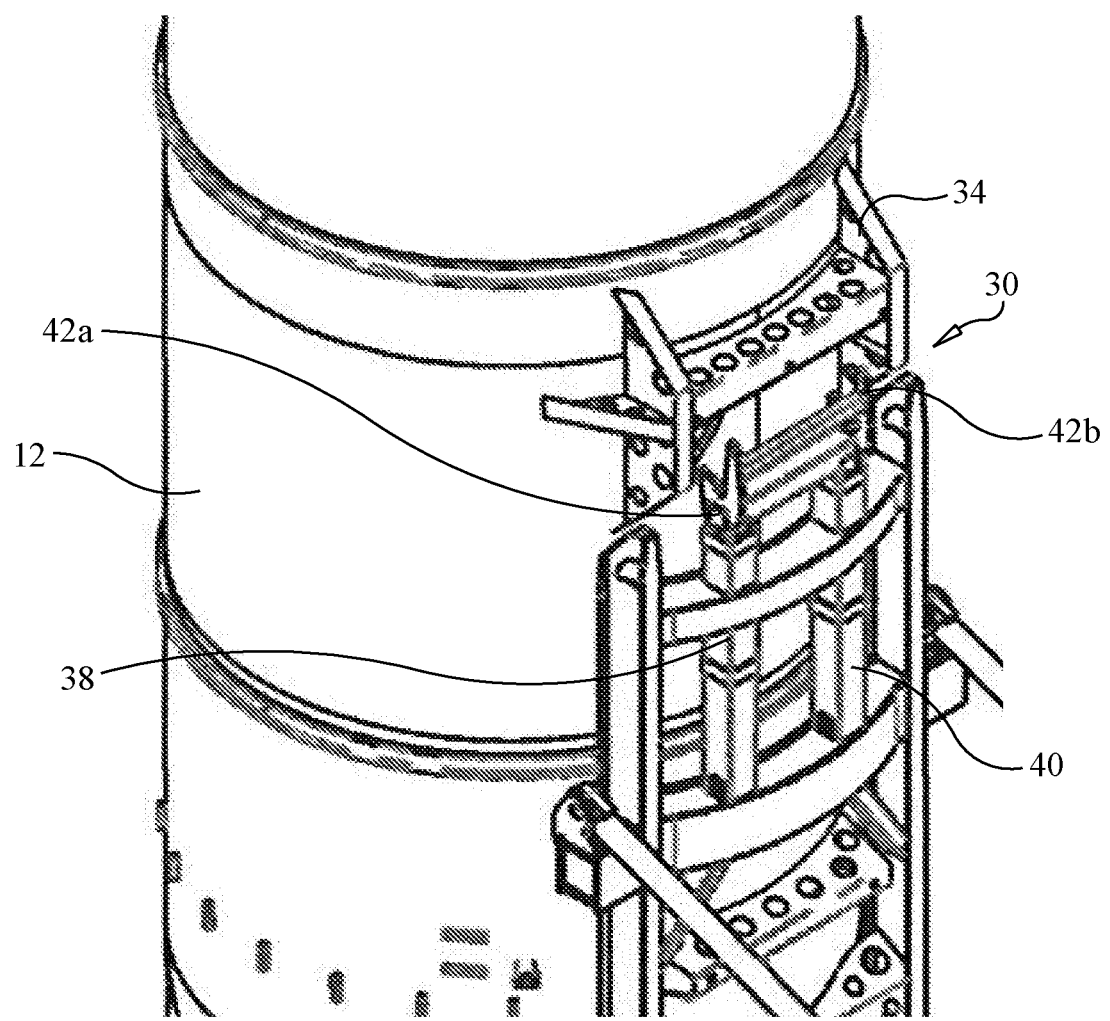
FIG. 3 is an enlarged, partial view of the incinerator transport trailer and incinerator, illustrating an engagement between an incinerator cradle and the incinerator.
Figure 8:
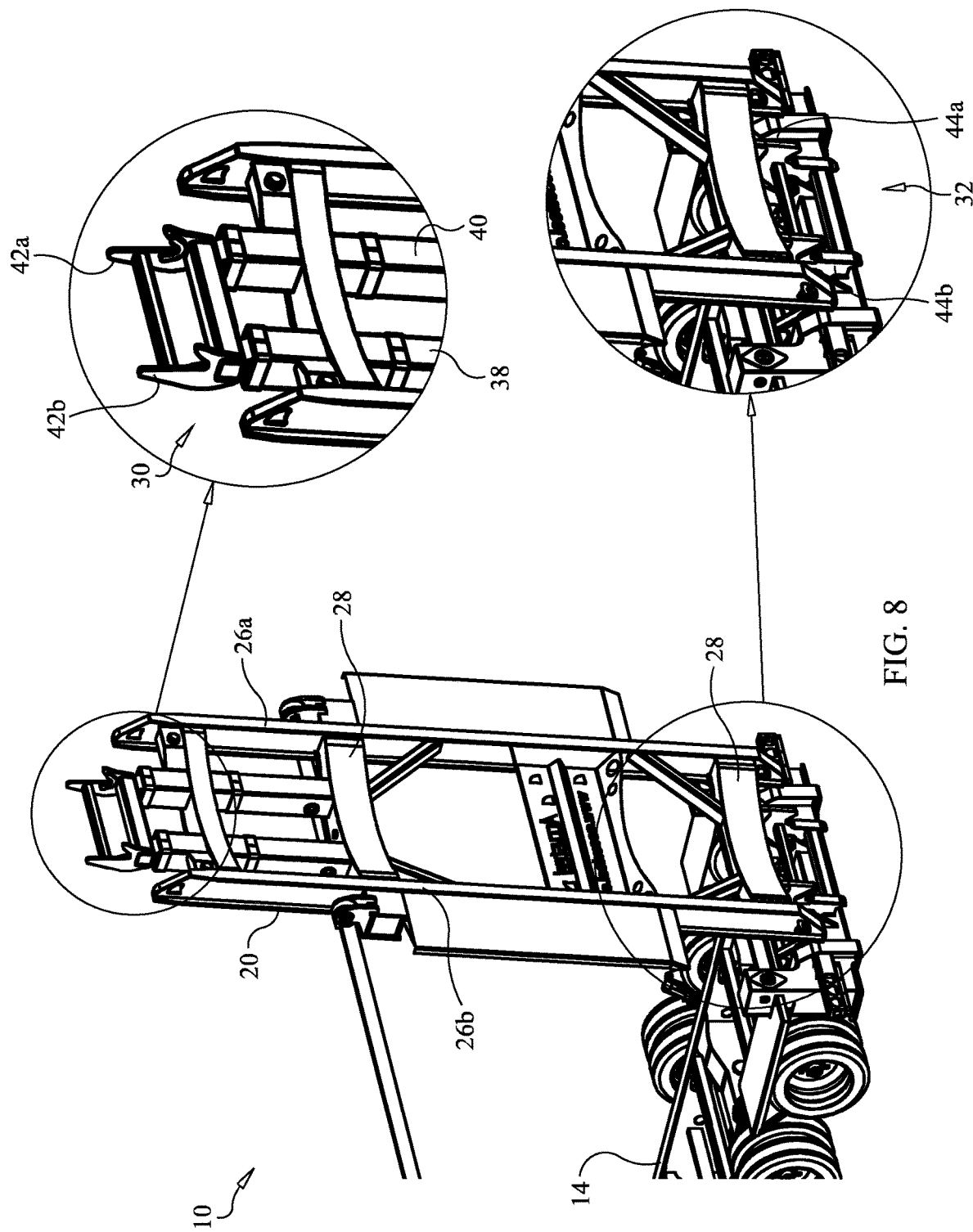
FIG. 8 is a partial, enlarged perspective view of the incinerator transport trailer.
Figure 9:
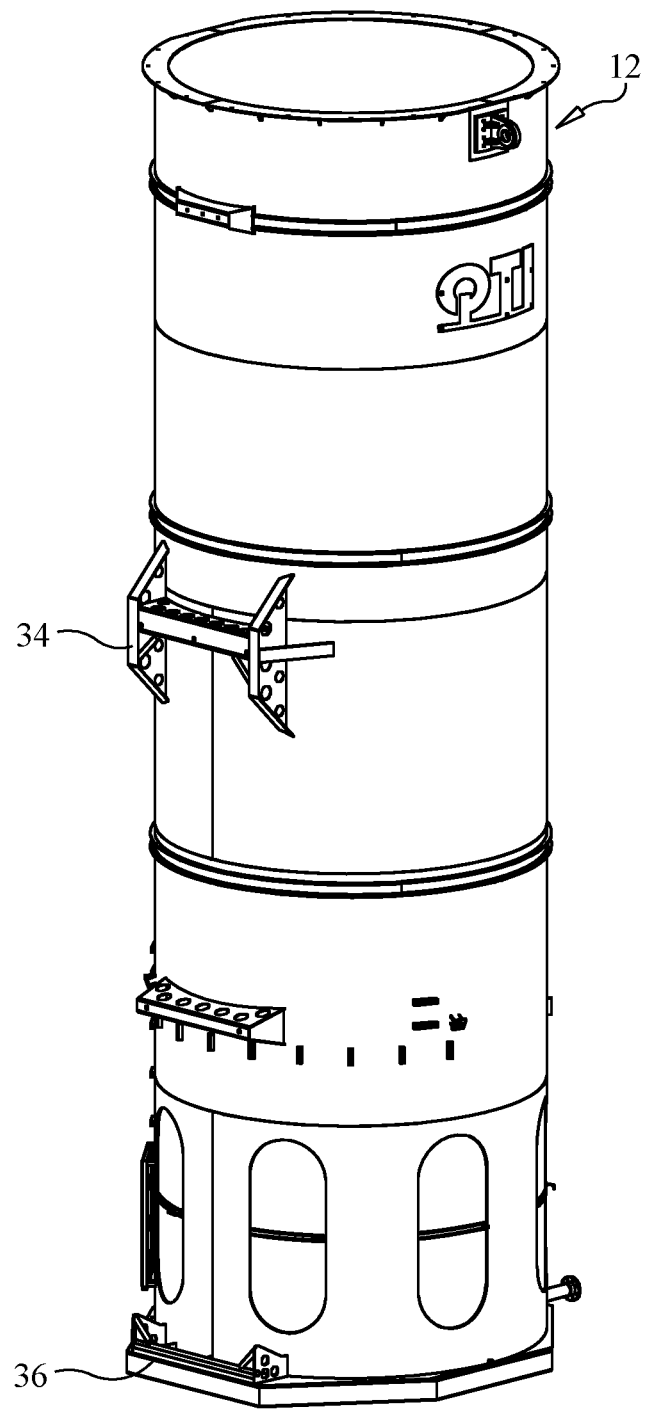
FIG. 9 is a perspective view of the incinerator.

As best seen in FIGS. 3 and 8, cradle 20 further comprises an upper, incinerator engagement 30 and a lower, incinerator engagement 32. The incinerator engagements 30 and 32 removably connect to respective supports or brackets that are disposed on the incinerator 12 to lift and secure the incinerator on the cradle. Particularly, the upper incinerator engagement 30 is configured to removably connect with bracket 34 that is disposed on the incinerator 12 at a location near the top end of the incinerator. Similarly, the lower incinerator engagement 32 is configured to removably connect with bracket 36 that is disposed on the incinerator 12 at a location toward the bottom end of the incinerator.

The upper incinerator engagement 30 is connected to the cradle 20 for movement relative thereto along a direction generally parallel to the cradle. As shown, the upper incinerator engagement 30 is connected to a pair of extendable posts 38 and 40 that are movable between extended and retracted positions by one or more hydraulic cylinders. Further, as shown, the upper incinerator engagement 30 includes a pair of fork-shaped members 42a and 42b that engage with upper incinerator bracket 34 in a direction toward the top end or away from the pivot coupling between the cradle 20 and the chassis 14. Similarly, the lower incinerator engagement 32 includes a pair of fork-shaped members 44a and 44b that face in a direction oppositely from the direction of fork-shaped members 42a and 42b.

To this end, the incinerator is lifted and secured to the cradle by raising or moving the upper incinerator engagement 30 so that the forked-shaped members 42a and 42b engage the upper incinerator bracket 34 and lift the incinerator 12 from the ground and engage the fork-shaped members 44a and 44b of the lower incinerator engagement 32 with the lower incinerator bracket 36, thereby locking or securing the incinerator to the cradle 20. Once the incinerator 12 is secured to the cradle 20, the cradle 20 can be tilted to move the cradle between the raised and lowered positions. The opposite procedure is followed to place the incinerator 12 on the ground from the trailer 10.

The trailer 14 further includes a pair of outriggers 46a and 46b located on opposite sides of the trailer that are extended to support the trailer during loading and unloading the incinerator 12.

One or more specific embodiments of the disclosed and claimed invention have been described in detail. Nevertheless, it will be understood that various modifications may be made without departing from the spirit and scope of the disclosure. Accordingly, other implementations are within the scope of the following claims.

What is claimed is:

1. An incinerator transport trailer comprising:
a chassis having a first end and a second end, said chassis having a hitch at said first end and ground engaging wheels at said second end;
an incinerator receiving and supporting cradle having a first end and a second end, said cradle pivotally attached to said chassis for movement relative to said chassis between a travel position in which said cradle is positioned parallel to and extends along said chassis and a raised position in which said cradle extends generally perpendicular to said chassis;

a first incinerator engagement attached to said cradle toward said first end of said cradle for back-and-forth movement along a direction extending generally between said first and said second ends of said cradle;

a second incinerator engagement attached to said cradle toward said second end of said cradle;

wherein said first incinerator engagement is movable to increase or decrease a distance between said first incinerator engagement and said second incinerator engagement; and wherein said first incinerator engagement comprises one or more forked-shaped members that face in a direction toward said first end of said cradle.

2. The incinerator transport trailer of claim 1, wherein said second end of said cradle is pivotally attached to said chassis about said second end of said chassis.

3. The incinerator transport trailer of claim 1, wherein said chassis has outrigger support legs at said second end of said chassis.

4. The incinerator transport trailer of claim 1, wherein said cradle comprises a pair of elongated side rails connected in a spaced relation and a plurality of transverse rails extending between and spaced along said elongated side rails, and wherein at least one of said plurality of transverse rails has a concave surface for engagement with a curved sidewall of an incinerator.

5. The incinerator transport trailer of claim 1, wherein said second incinerator engagement comprises one or more forked-shaped members that face in a direction toward said second end of said cradle.

6. The incinerator transport trailer of claim 1, further comprising a hydraulic cylinder pivotally attached at one end to said cradle and pivotally attached at an opposite end to said chassis, said hydraulic cylinder movable between extended and retracted positions to move said cradle between said raised and travel positions.

7. An incinerator transport system comprising:
an incinerator having a top end and a bottom end and a sidewall extending between said top and bottom ends;
said incinerator further having first engagement bracket disposed toward said top end of said incinerator and a second engagement bracket disposed toward said bottom end of said incinerator;
a trailer comprising a chassis having a first end and a second end, said chassis having a hitch at said first end and ground engaging wheels at said second end;

an incinerator receiving and supporting cradle having a first end and a second end, said cradle pivotally attached to said chassis for movement relative to said chassis between a travel position in which said cradle is positioned parallel to and extends along said chassis and a raised position in which said cradle extends generally perpendicular to said chassis;

a first incinerator engagement attached to said cradle toward said first end of said cradle for back-and-forth movement along a direction extending generally between said first and said second ends of said cradle;

a second incinerator engagement attached to said cradle toward said second end of said cradle;

wherein said first incinerator engagement is movable to increase or decrease a distance between said first incinerator engagement and said second incinerator engagement;

wherein said incinerator is removably secured to said cradle by said first incinerator engagement engaged with said first engagement bracket and said second incinerator engagement engaged said second engagement bracket; and wherein said first incinerator engagement comprises one or more forked-shaped members that face in a direction toward said first end of said cradle.

8. The incinerator transport system of claim 7, wherein said second end of said cradle is pivotally attached to said chassis about said second end of said chassis.

9. The incinerator transport system of claim 7, wherein said chassis has outrigger support legs at said second end of said chassis.

10. The incinerator transport system of claim 7, wherein said cradle comprises a pair of elongated side rails connected in a spaced relation and a plurality of transverse rails extending between and spaced along said elongated side rails, and wherein at least one of said plurality of transverse rails has a concave surface for engagement with a curved sidewall of an incinerator.

11. The incinerator transport system of claim 7, wherein said second incinerator engagement comprises one or more forked-shaped members that face in a direction toward said second end of said cradle.

12. The incinerator transport system of claim 7, further comprising a hydraulic cylinder pivotally attached at one end to said cradle and pivotally attached at an opposite end to said chassis, said hydraulic cylinder movable between extended and retracted positions to move said cradle between said raised and travel positions.

* * * * *